(12) United States Patent
Pang et al.

(10) Patent No.: US 8,929,549 B2
(45) Date of Patent: Jan. 6, 2015

(54) METHOD AND DEVICE FOR SETTING UP WIRELESS NETWORK CONNECTION

(71) Applicant: Huawei Device Co., Ltd., Shenzhen (CN)

(72) Inventors: Gaokun Pang, Shenzhen (CN); Guiming Shu, Shenzhen (CN); Zhiming Ding, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 17 days.

(21) Appl. No.: 13/731,306

(22) Filed: Dec. 31, 2012

(65) Prior Publication Data

US 2014/0050319 A1 Feb. 20, 2014

Related U.S. Application Data

(63) Continuation of application No. PCT/CN2012/080230, filed on Aug. 16, 2012.

(51) Int. Cl.
| | |
|---|---|
| *H04L 9/00* | (2006.01) |
| *H04W 76/02* | (2009.01) |
| *H04W 12/04* | (2009.01) |
| *H04W 48/20* | (2009.01) |
| *H04W 48/14* | (2009.01) |

(52) U.S. Cl.
CPC ............. *H04W 76/02* (2013.01); *H04W 12/04* (2013.01); *H04W 48/20* (2013.01); *H04W 76/023* (2013.01); *H04W 48/14* (2013.01)
USPC ................. 380/270; 380/37; 726/3; 709/221; 709/230; 709/231; 370/311; 370/329

(58) Field of Classification Search
USPC ......... 380/270, 37; 726/3; 709/221, 230, 231; 370/311, 329
See application file for complete search history.

(56) References Cited

U.S. PATENT DOCUMENTS

| | | | |
|---|---|---|---|
| 7,088,966 B2 * | 8/2006 | Petersen | 455/115.3 |
| 7,720,018 B2 * | 5/2010 | Hassan et al. | 370/311 |
| 2003/0016142 A1 * | 1/2003 | Holmes et al. | 340/870.11 |

(Continued)

FOREIGN PATENT DOCUMENTS

| | | |
|---|---|---|
| CN | 101212780 A | 7/2008 |
| CN | 101394648 A | 3/2009 |
| CN | 101959282 A | 1/2011 |
| CN | 102172077 A | 8/2011 |

OTHER PUBLICATIONS

Foreign Communication From A Counterpart Application, PCT Application No. PCT/CN2012/080230, Chinese International Search Report dated on May 23, 2013, 6 pages.

(Continued)

*Primary Examiner* — Beemnet Dada
*Assistant Examiner* — Sayed Beheshti Shirazi
(74) *Attorney, Agent, or Firm* — Conley Rose, P.C.; Grant Rodolph; Nicholas K. Beaulieu

(57) ABSTRACT

The present invention provides a method and device for setting up a wireless network connection. The second device sets up a connection with the wireless network according to the network configuration information. With the present invention, user participation when a terminal is connected to the wireless network is reduced, and efficiency in setting up a wireless network connection is improved.

10 Claims, 10 Drawing Sheets

(56) References Cited

U.S. PATENT DOCUMENTS

| | | | |
|---|---|---|---|
| 2003/0108009 A1* | 6/2003 | Petersen | 370/332 |
| 2006/0168292 A1* | 7/2006 | Yukimatsu | 709/231 |
| 2006/0239217 A1* | 10/2006 | Hassan et al. | 370/311 |
| 2009/0262666 A1* | 10/2009 | Eggert et al. | 370/254 |
| 2009/0312047 A1* | 12/2009 | Satou et al. | 455/522 |
| 2010/0110999 A1* | 5/2010 | Li et al. | 370/329 |
| 2010/0313241 A1* | 12/2010 | Lee et al. | 726/3 |
| 2011/0102138 A1* | 5/2011 | Girard et al. | 340/5.61 |
| 2011/0189988 A1* | 8/2011 | Morimoto et al. | 455/422.1 |
| 2011/0194636 A1* | 8/2011 | Monk et al. | 375/260 |
| 2011/0273321 A1* | 11/2011 | Joshi et al. | 342/27 |
| 2011/0302282 A1* | 12/2011 | Dadlani Mahtani et al. | 709/221 |
| 2013/0189925 A1* | 7/2013 | Staskawicz et al. | 455/41.1 |
| 2013/0230032 A1* | 9/2013 | Lu et al. | 370/336 |
| 2014/0115058 A1* | 4/2014 | Yin et al. | 709/204 |

OTHER PUBLICATIONS

Foreign Communication From A Counterpart Application, PCT Application No. PCT/CN2012/080230, Chinese Written Opinion dated May 23, 2013, 4 pages.

* cited by examiner

METHOD AND DEVICE FOR SETTING UP WIRELESS NETWORK CONNECTION

CROSS-REFERENCE TO RELATED APPLICATION

This application is a continuation of International Application No. PCT/CN2012/080230, filed on Aug. 16, 2012, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to communication technologies, and in particular, to a method and device for setting up a wireless network connection.

BACKGROUND

Due to advantages such as rapid deployment, convenience for use, and high transmission rate, a wireless local area network (e.g., a Wireless Fidelity (WiFi) network) develops rapidly and is widely applied in various fields. At present, many notebook computers, mobile phones and so on support a WiFi technology, and access points (AP) of a WiFi network are widely available at places such as hotels, coffee shops, and hospitals.

When a connection is set up in the WiFi network, network configuration information, for example, a key, which is needed for setting up the connection with the WiFi network, needs to be configured on a terminal first, so that the terminal can set up the connection with the AP and access the WiFi network. In the prior art, the network configuration information is usually entered manually by a user. For example, in a restaurant such as McDonald's or a coffee shop, the user needs to get a piece of password paper at a service counter and enter a password (namely, network configuration information) on the password paper onto a terminal of the user, so that the user can access the WiFi network in the restaurant; or, when an enterprise holds an internal meeting in a meeting room, in order to prevent another person outside the meeting room from accessing, participants in the meeting room also need to enter a password (namely network configuration information) manually, so that the participants can access the WiFi network in the meeting room after authentication.

To simplify a process of setting up the connection with the WiFi network, the WiFi alliance formulates a wireless network security setup (e.g., a WiFi protected setup (WPS)) method, and the automatic configuration of part of information needed by a network, for example, a service set identifier (SSID) may be implemented through WPS and the security connection of the network is implemented. However, at the beginning of the WPS process, network configuration information also needs to be configured on the terminal, so that the terminal sets up the connection with the AP according to the network configuration information and subsequent transmission of information such as the SSID of the WPS can be executed. In addition, the network configuration information on the terminal is also configured manually by a user, for example, the user needs to search the AP for a personal identification number (PIN) located on the label of the AP, and then enter the PIN onto the terminal manually.

To sum up, currently, when the connection is set up in the WiFi network, the operation of configuring the network configuration information on the terminal is complex and mostly requires manual participation of the user, thereby causing low efficiency in setting up a wireless network connection.

SUMMARY

Embodiments of the present invention provide a method and device for setting up a wireless network connection to reduce user participation when a terminal is connected to an AP and improve efficiency in setting up a wireless network connection.

A first aspect of the embodiment of the present invention provides a method for setting up a wireless network connection, where the method includes: sending, by a first device, a probe message to a second device by using a first transmit power, and receiving a first response message returned by the second device, where the first response message carries a first receive power when the second device receives the probe message; or, sending, by the first device, a probe message to the second device, where the probe message is used to instruct the second device to send a second response message by using a second transmit power, and receiving, by the first device, the second response message, and obtaining, through detection, a second receive power when receiving the second response message; or, sending, by the first device, a probe message to a second device by using a first transmit power, where the probe message is used to instruct the second device to send a third response message by using a second transmit power, receiving, by the first device, the third response message, where the third response message carries a first receive power when the second device receives the probe message, and obtaining, by the first device and through detection, a second receive power when receiving the third response message; obtaining, by the first device and according to the first transmit power and the first receive power or according to the second transmit power and the second receive power, a path loss between the first device and the second device; and when determining, according to the path loss, that a distance between the first device and the second device is within a preset distance range, sending, by the first device, network configuration information needed for accessing a wireless network to the second device, so that the second device sets up a connection with the wireless network according to the network configuration information.

In one possible implementation manner, the path loss obtained by the first device according to the first transmit power and the first receive power is a first path loss; the path loss obtained by the first device according to the second transmit power and the second receive power is a second path loss; and after the first device determines, according to the path loss, that the distance between the first device and the second device is within the preset distance range and before the first device sends the network configuration information needed for accessing the wireless network to the second device, the method further includes: comparing, by the first device, the second path loss with the first path loss, and if a loss variation value between the two is within a preset loss variation value range, identifying a terminal as a real device.

In another possible implementation manner, there are multiple path losses obtained by the first device; and after the first device determines, according to the path loss, that the distance between the first device and the second device is within the preset distance range and before the first device sends the network configuration information needed for accessing the wireless network to the second device, the method further includes: calculating, by the first device, a floating variation value of the multiple path losses, and if the floating variation value is within a preset floating variation value range, identifying a terminal as a real device.

In still another possible implementation manner, before the first device sends the probe message to the second device, the method further includes: obtaining, by the first device, a key from the second device by using a key exchange algorithm to encrypt, by using the key, the probe message sent to the second device and decrypt, by using the key, the response message received from the second device, where the response message is the first response message, the second response message or the third response message.

Another aspect of the embodiments of the present invention provides a method for setting up a wireless network connection, where the method includes: receiving, by a second device, a probe message that is sent by a first device by using a first transmit power, and returning a first response message to the first device, where the first response message carries a first receive power when the second device receives the probe message; or, receiving, by the second device, a probe message sent by the first device, where the probe message is used to instruct the second device to send a second response message by using a second transmit power, and sending, by the second device, the second response message to the first device, so that the first device obtains, through detection, a second receive power when receiving the second response message; or, receiving, by the second device, a probe message that is sent by the first device by using a first transmit power, where the probe message is used to instruct the second device to send a third response message by using a second transmit power, sending, by the second device, the third response message to the first device, where the third response message carries a first receive power when the second device receives the probe message, so that the first device obtains, through detection, a second receive power when receiving the third response message; receiving, by the second device, network configuration information which is needed for accessing a wireless network and sent by the first device, where the network configuration information is sent by the first device when the first device determines, according to the first transmit power and the first receive power or according to the second transmit power and the second receive power, that a distance between the first device and the second device is within a preset distance range; and setting up, by the second device, a connection with the wireless network according to the network configuration information.

In one possible implementation manner, before the second device receives the probe message sent by the first device, the method further includes: obtaining, by the second device, a key from the first device by using a key exchange algorithm to encrypt, by using the key, a response message sent to the first device and decrypt, by using the key, the probe message received from the first device, where the response message is the first response message, the second response message or the third response message.

Still another aspect of the embodiments of the present invention provides a first device, including: a message transmitting unit configured to: send a probe message to a second device by using a first transmit power, and receive a first response message returned by the second device, where the first response message carries a first receive power when the second device receives the probe message; or, send a probe message to the second device, where the probe message is used to instruct the second device to send a second response message by using a second transmit power, receive the second response message, and obtain, through detection, a second receive power when receiving the second response message; or, send a probe message to a second device by using a first transmit power, where the probe message is used to instruct the second device to send a third response message by using a second transmit power; receive the third response message, where the third response message carries a first receive power when the second device receives the probe message; and obtain, through detection, a second receive power when receiving the third response message; a distance determining unit configured to: obtain, according to the first transmit power and the first receive power or according to the second transmit power and the second receive power, a path loss between the first device and the second device; and determine, according to the path loss, that a distance between the first device and the second device is within a preset distance range; and an information sending unit configured to, when the distance determining unit determines that the distance between the first device and the second device is within the preset distance range, send network configuration information to the second device, so that the second device sets up, according to the network configuration information, a connection with the wireless network.

In one possible implementation manner, the path loss obtained by the distance determining unit according to the first transmit power and the first receive power is a first path loss, and the path loss obtained according to the second transmit power and the second receive power is a second path loss.

The first device further includes a device identifying unit configured to: compare the second path loss with the first path loss, and if a loss variation value between the two is within a preset loss variation value range, identify a terminal as a real device, and instruct the information sending unit to send the network configuration information to the second device.

In another possible implementation manner, there are multiple path losses obtained by the distance determining unit; and the device identifying unit is further configured to: calculate a floating variation value of the multiple path losses, and if the floating variation value is within a preset floating variation value range, identify a terminal as a real device, and instruct the information sending unit to send the network configuration information to the second device.

In another possible implementation manner, a key exchanging unit is configured to, before the probe message is sent to the second device, obtain, by the first device, a key from the second device by using a key exchange algorithm to encrypt, by using the key, the probe message sent to the second device and decrypt, by using the key, a response message received from the second device, where the response message is the first response message, the second response message or the third response message.

Still another aspect of the embodiments of the present invention provides a second device, including: a message transmitting unit configured to: receive a probe message that is sent by a first device by using a first transmit power, and return a first response message to the first device, where the first response message carries a first receive power when the second device receives the probe message; or, receive a probe message sent by the first device, where the probe message is used to instruct the second device to send a second response message by using a second transmit power, and send the second response message to the first device, so that the first device obtains, through detection, a second receive power when receiving the second response message; or, receive a probe message that is sent by the first device by using a first transmit power, where the probe message is used to instruct the second device to send a third response message by using a second transmit power, and send the third response message to the first device, where the third response message carries a first receive power when the second device receives the probe message, so that the first device obtains, through detection, a second receive power when receiving the third response message; an information receiving unit configured to receive network configuration information which is needed for accessing a wireless network and sent by the first device, where the network configuration information is sent by the first device when the first device determines, according to the first transmit power and the first receive power or according to the second transmit power and the second receive power, that a distance between the first device and the second device is within a preset distance range; and a connection setup unit configured to set up a connection with the wireless network according to the network configuration information.

In one possible implementation manner, the second device further includes a key exchanging unit configured to, before the probe message sent by the first device is received, obtain a key from the first device by using a key exchange algorithm to encrypt, by using the key, a response message sent to the first device and decrypt, by using the key, the probe message received from the first device, where the response message is the first response message, the second response message or the third response message.

Technical effects of the method and device for wireless network setup provided in the embodiments of the present invention are: When the first device determines, according to the path loss between the first device and the second device, that the distance between the second device and the first device is within the preset distance range, the first device sends the network configuration information to the second device. In this manner, a user only needs to make the first device and the second device close to each other, so that the first device may automatically execute the foregoing calculation and determination, and automatically send the network configuration information to the second device. Compared with manners in the prior art, such as a manner in which the user manually searches for and enters a PIN, an operation process that the user participates in is greatly simplified, and compared with a manual configuration process, an automatic configuration process also improves efficiency of wireless network setup.

DETAILED DESCRIPTION

The following concept in embodiments of the present invention is described first.

In the embodiments of the present invention, a first device may be a device having functions of detecting, calculating, and sending, for example, a mobile terminal having the foregoing functions. In each of the following embodiments of the present invention, the first device is referred to as an AP mate; the AP mate pre-stores network configuration information, and automatically sends the network configuration information to a second device.

The second device refers to various terminals that intend to access a wireless network, for example, a mobile phone and a notebook computer; and in each embodiment of the present invention, processes executed by the second device are described by taking a terminal as an example.

The wireless network is not limited to a WiFi network, for example, it may also be applicable to wireless networks such as Worldwide Interoperability for Microwave Access (WiMax), Zigbee, 3rd Generation of Mobile Telecommunications Technology (3G), and Global System for Mobile Communications (GSM).

In addition, a probe message in the embodiments of the present invention is a message that is sent by the first device to the second device and is used to probe a path loss between the first device and the second device. In specific implementation, the probe message may be a message sent independently, that is, the first device specially sends the probe message to the second device, or the probe message may be an existing message between the first device and the second device, where the message also has a function required by the embodiments and is also referred to as a probe message. For example, if an instruction parameter used to instruct the second device to return a response message by using a certain transmit power is added to an existing message, the existing message has a function of the probe message in the embodiments of the present invention, and may also be referred to as a probe message.

Embodiment 1

Figure 1:
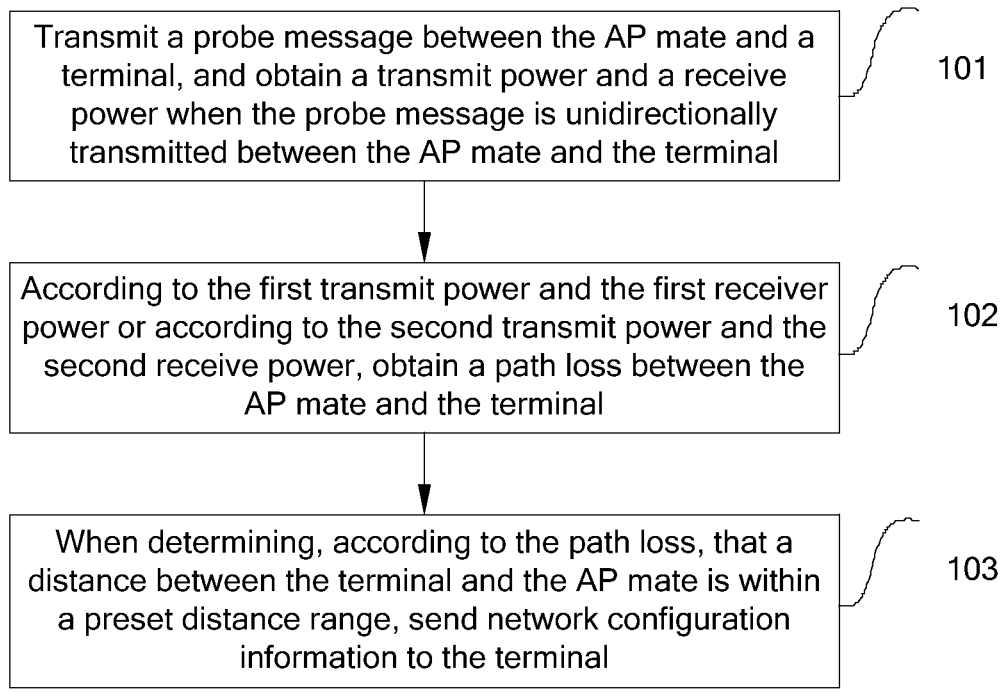
FIG. 1 is a schematic flowchart of an embodiment of a method for setting up a wireless network connection according to the present invention.

FIG. 1 is a schematic flowchart of an embodiment of a method for setting up a wireless network connection according to the present invention. The method in this embodiment is executed by an AP mate. As shown in FIG. 1, the method may include:

101. Transmit a probe message between the AP mate and a terminal, and obtain a transmit power and a receive power when the probe message is unidirectionally transmitted between the AP mate and the terminal.

The unidirectional transmission refers to that, for example, the local, namely, the AP mate, sends the probe message and the terminal receives the probe message, where the message is transmitted from the AP mate to the terminal; or the terminal sends the probe message and the AP mate receives the probe message, where the message is transmitted from the terminal to the AP mate.

Accordingly, in the unidirectional transmission, if the message is transmitted from the AP mate to the terminal, a power when the AP mate sends the probe message is the transmit power, while a power when the terminal receives the probe message is the receive power. If the message is transmitted from the terminal to the AP mate, a power when the terminal sends the probe message is the transmit power, while a power when the AP mate receives the probe message is the receive power.

For example, the AP mate sends a probe message to the terminal by using a first transmit power, and receives a first response message returned by the terminal, where the first response message carries a first receive power when the terminal receives the probe message.

For another example, the AP mate sends a probe message to the terminal, where the probe message is used to instruct the terminal to send a second response message by using a second transmit power, and the AP mate receives the second response message and obtains, through detection, a second receive power when receiving the second response message.

For still another example, the AP mate sends a probe message to the terminal by using a first transmit power, where the probe message is used to instruct the terminal to send a third response message by using a second transmit power, the AP mate receives the third response message, where the third response message carries a first receive power when the terminal receives the probe message, and the AP mate obtains, through detection, a second receive power when receiving the third response message.

The foregoing third manner (that is, the manner in the still another example) is different from the previous two manners in that, in the previous two manners, two powers are obtained by transmitting two messages. For example, in the first manner, two powers, namely, the first transmit power and the first receive power, are obtained by transmitting two messages, namely, the probe message and the first response message. While in the third manner, four powers are obtained by transmitting two messages, and efficiency is higher. For example, four powers, namely, the first transmit power, the first receive power, the second transmit power, and the second receive power, are obtained by transmitting two messages, namely, the probe message and the third response message.

It should be noted that, several feasible manners are listed in the foregoing, which only intends to express that these manners may be adopted when a first device obtains a power (such as the first transmit power and the first receive power), and each of the manners can be used to obtain a power parameter value. However, in this embodiment, it is not limited that only one of the manners can be executed in the method in this embodiment. It can also be seen from subsequent embodiments that in specific implementation, the first device may execute one of the foregoing three manners or any combination of the foregoing three manners, or execute a certain manner multiple times, and so on, which depends on the actual execution need of the first device. For example, when the first device needs to determine whether a second device is a real device, the first device may need to execute a combination of the foregoing manners or execute a certain manner multiple times to obtain a related parameter.

In addition, it should also be noted that, a power parameter in this embodiment, for example, the first transmit power, the first receive power, may also be converted into another measuring unit in specific implementation. The power in this embodiment involves the following case. For example, a power value may be equivalently converted into a signal strength value, Signal strength=$10*\log_{10}$(power value), where a unit of signal strength is decibels relative to one milliwatt (dBm), and a unit of the power value is milliwatt (mW).

102. According to the first transmit power and the first receiver power or according to the second transmit power and the second receive power, obtain a path loss between the AP mate and the terminal during transmission.

The path loss may be calculated according to an existing path loss formula, that is, "path loss=$32.5+20*\log(f)+\log(D)$," where path loss is in the unit of dB, where f is frequency in the unit of gigahertz (GHz), and where D is distance in the unit of meter (m).

It can be seen from the foregoing path loss formula that the path loss is related to a distance, different distances bring about different losses. In general, the farther the distance is, the higher the path loss is.

The AP mate may obtain the path loss according to the first transmit power and the first receive power, and may also obtain, through calculation, the path loss according to the second transmit power and the second receive power. These two manners are optional manners. In specific implementation, the AP mate may select any manner to calculate the path loss, or execute both manners to obtain multiple path losses.

103. When determining, according to the path loss, that a distance between the terminal and the AP mate is within a preset distance range, send network configuration information to the terminal.

In this embodiment, it is set that the AP mate determines the distance between the terminal and the AP mate according to the path loss, and if the distance is within the preset distance range, the AP mate sends the network configuration information to the terminal. That is, the distance is used as a condition for triggering sending of the network configuration information to the terminal by the AP mate. In specific implementation, when a user intends a certain terminal to execute a WPS connection with the AP mate, the user may make the terminal close to the AP mate or make the AP mate close to the terminal, and then the AP mate automatically executes the foregoing steps. The AP mate calculates a path loss, and determines a distance between the terminal and the AP mate according to the path loss; if a preset distance range is met, the AP mate automatically sends network configuration information to the terminal.

In this manner, the user only needs to make the AP mate and the terminal close to each other. Compared with manners in the prior art, such as a manner in which a user manually searches for and enters a PIN, the operation is simpler for the user, and user participation is greatly reduced; in addition, a label bearing the PIN does not need to be set on the AP, which also reduces a device cost.

There may be multiple manners for determining the distance between the terminal and the AP mate according to the path loss. For example, assuming that the preset distance range is 1 m-1.5 m, the AP mate may obtain, through calculation, a distance D according to the path loss and the foregoing path loss formula, and determines whether D is within 1 m-1.5 m; or the AP mate converts the preset distance range 1 m-1.5 m into a path loss range in advance according to the preset distance range 1 m-1.5 m and the foregoing path loss formula. For example, a path loss corresponding to 1 m is q1 and a path loss corresponding to 1.5 m is q2, that is, a preset path loss range is q1-q2, and then the AP mate only needs to determine whether the obtained path loss is within the preset path loss range; if the obtained path loss is within the range, it indicates that the distance between the terminal and the AP mate is within the preset distance range.

It should be noted that the preset distance range includes a point value, for example, it is a distance value rather than a distance range. For example, if the preset distance range is 1 m, the AP mate only needs to determine whether a distance corresponding to the path loss is 1 m. In addition, the preset distance range may be set by the user independently. In specific implementation, for example, a user interactive interface may be set on the AP mate, and the user may properly adjust the preset distance range or the preset path loss range at any time through the interface.

The network configuration information, for example, may be a PIN code and a key of the AP. If the network configuration information is a key, a length of the key in this embodiment may be set to any value to ensure network security after configuration. After obtaining the network configuration information, the terminal sets up a wireless network connection with the AP according to the network configuration information. The setting up the wireless network connection is, for example: After setting up a connection with the AP, the terminal executes a wireless network security setup WPS procedure between the terminal and the AP, for example, performing authentication and WiFi configuration information transmission with the AP, where the WPS procedure is an existing processing procedure, and details are not further described.

Embodiment 2

Figure 2:
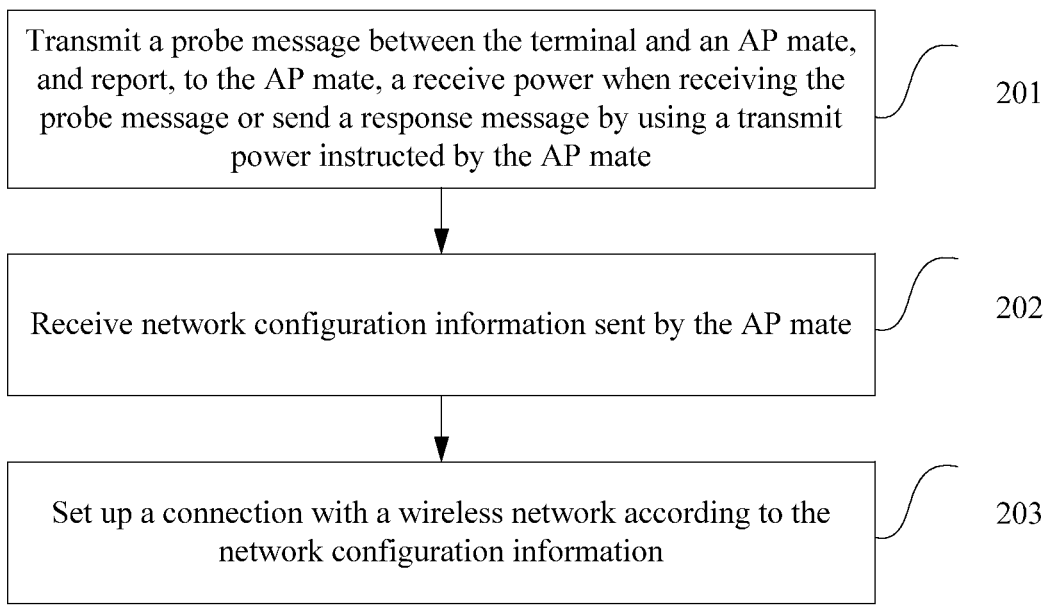
FIG. 2 is a schematic flowchart of another embodiment of a method for setting up a wireless network connection according to the present invention.

FIG. 2 is a schematic flowchart of another embodiment of a method for setting up a wireless network connection according to the present invention. The method in this embodiment is executed by a terminal. As shown in FIG. 2, the method may include:

201. Transmit a probe message between the terminal and an AP mate, and report, to the AP mate, a receive power when receiving the probe message, or send a response message by using a transmit power instructed by the AP mate.

When the probe message is transmitted from the AP mate to the terminal, the terminal reports, to the AP mate, the receive power when receiving the probe message, and the AP mate itself learns its transmit power; or when the probe message is transmitted from the terminal to the AP mate, the terminal may report the transmit power of the message to the AP mate. Because the transmit power is a power with which the terminal sends the probe message as instructed by the AP mate, the AP mate may also learn the transmit power even if the terminal does not report it. The AP mate itself also obtains the receive power when receiving the probe message. Through the foregoing step, the AP mate obtains the transmit power and receive power of the probe message in unidirectional transmission.

For a specific execution manner, reference may be made to the description of 101 in Embodiment 1, and details are not further described.

202. Receive network configuration information sent by the AP mate.

The network configuration information may be, for example, a PIN code and a key of the AP. The network configuration information is sent by the AP mate when the AP mate calculates, according to the foregoing transmit power and receive power, a path loss occurring in the transmission of the probe message, and determines, according to the path loss, that a distance between the terminal and the AP mate is within a preset range. That is, through step 201 and step 202, the AP mate may automatically determine the distance between the terminal and the AP mate, and automatically send the network configuration information to the terminal when the distance is within the preset distance range. In this manner, a user only needs to make the AP mate and the terminal close to each other, which greatly simplifies a user's operation.

203. Set up a connection with a wireless network according to the network configuration information.

Interaction processes between the AP mate and the terminal are described in detail in the following Embodiment 3 to Embodiment 7, and several feasible implementation manners are illustrated. A same process involved in the embodiments is described in detail in one embodiment only, and is briefly described in other embodiments.

First, several scenarios in which the method for setting up a wireless network connection in each embodiment of the present invention can be applied are illustrated. For example, when an internal meeting is held in a meeting room, an AP mate may be set in the meeting room, the following method processes are executed between the AP mate and a terminal of each participant in the meeting room, the terminal is configured automatically, and participants do not need to obtain a password any longer; or, in restaurants such as McDonald's and Kentucky Fried Chicken (KFC), an AP mate may also be set, the AP mate and a terminal of a customer automatically execute the following method processes, the terminal is configured automatically, and the customer does not need to get a piece of password paper at a service counter; or, in WPS configuration, a user does not need to enter network configuration information, for example, a PIN code, manually into a terminal any longer, but may make the terminal and an AP mate close to each other, and the AP mate and the terminal execute the following method processes. The AP mate can automatically identify a user within a certain range, for example, a meeting room range, a store range, or a close range preset during WPS, and automatically send network configuration information to the terminal, and the terminal is automatically connected to a network according to the information, which omits complex processes such as entering a password by the user.

Embodiment 3

Figure 3:
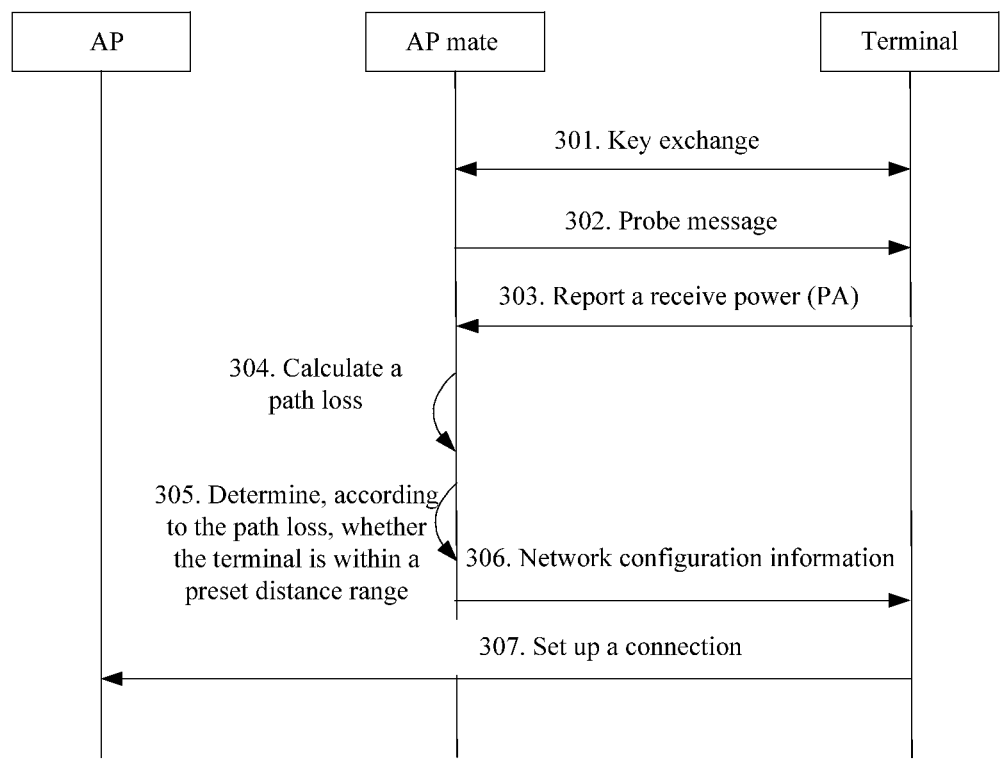
FIG. 3 is a schematic signaling diagram of still another embodiment of a method for setting up a wireless network connection according to the present invention.

FIG. 3 is a schematic signaling diagram of still another embodiment of a method for setting up a wireless network connection according to the present invention. In this embodiment, a power when an AP mate sends a probe message is a first transmit power, and a power when a terminal receives the probe message is a first receive power. As shown in FIG. 3, the method may include:

301. The AP mate and the terminal obtain a key by using a key exchange algorithm.

Before a probe message is transmitted, the AP mate and the terminal may obtain the key by using the key exchange algorithm. An interaction process in this step is mainly that the AP mate and the terminal exchanges some parameters needed to generate a key; and then the AP mate and the terminal each generate, according to the exchanged parameters, a key by using the key exchange algorithm. In subsequent processes of transmitting the probe message, the key is used to encrypt the probe message for transmission or to decrypt a response message returned by the terminal, to better ensure security of message transmission.

The foregoing key exchange algorithm may be a commonly-used algorithm, for example, Diffie-Hellman (D-H) key exchange algorithm, RSA algorithm for public-key encryption and the security. In addition, to trigger execution of the key exchange process between the AP mate and the terminal, optionally, a trigger button may be set on each of the AP mate and the terminal. After a user makes the AP mate and the terminal close to each other, this trigger button is pressed, and the AP mate and the terminal execute this step.

302. The AP mate sends a probe message to the terminal by using a transmit power P.

The transmit power P may be referred to as a first transmit power, may be preset in the AP mate and may also be generated by the AP mate randomly. However, the transmit power P is learned by the AP mate only. In addition, when sending the probe message, the AP mate may instruct the terminal to report a receive power when the terminal receives the probe message, for example, the AP mate may carry an instruction identifier in the probe message, so that the terminal reports the receive power according to the instruction identifier.

303. The terminal reports, to the AP mate, a receive power PA when receiving the probe message.

The terminal may report, according to the instruction identifier carried in the probe message sent by the AP mate and to the AP mate, the attenuated receive power when the terminal receives the probe message. For example, the terminal returns a first response message to the AP mate, where the first response message carries a first receive power when the terminal receives the probe message.

304. The AP mate calculates, according to the transmit power and the receive power for transmission of the probe message, a path loss in the transmission of the probe message from the AP mate to the terminal.

The transmit power is the first transmit power when the AP mate sends the probe message in 302, and the receive power is the first receive power which is reported by the terminal to the AP mate in 303. Power attenuation always occurs in message transmission. Generally, the longer a distance is, the more the power attenuation is. Therefore, the transmit power P (e.g., the first transmit power) is greater than the receive power PA (e.g., the first receive power).

For example, the AP mate calculates the path loss as "P-PA," which is the path loss occurring when the probe message is transmitted from the AP mate to the terminal. It should be noted that the path loss is not necessarily a difference between the transmit power and the receive power so long as it can indicate variation between the transmit power and the receive power. For example, the path loss may also be a ratio between the transmit power and the receive power or may be indicated by other mathematic methods that can indicate the variation. For example, First path loss=$\log_{10}$(first transmit power)–$\log_{10}$(first receive power).

305. The AP mate determines, according to the path loss, whether a distance between the terminal and the AP mate is within a preset distance range.

After obtaining the path loss P-PA through the calculation, the AP mate determines the distance between the terminal and the AP mate according to the path loss. As described above, the AP mate may perform determination according to the preset distance range or a preset loss path range.

For example, the value of the path loss P-PA is a dB. The AP mate may obtain, through the calculation, a distance D1 between the terminal and the AP mate according to a path loss formula "path loss=32.5+20*log(f)+log(D)," and in combination with a power f (GHz) of the probe message. Assuming that the D1 is 1 m and the preset distance range set in the AP mate is 0.9 m-1.2 m, the AP mate may determine that 1 m is within the range of 0.9 m-1.2 m.

For another example, the value of the path loss P-PA is a dB, and the AP mate obtains, through conversion in advance, a preset loss range according to a preset distance range of 0.9 m-1.2 m and the foregoing path loss formula. Specifically, when the distance is 0.9 m, a path loss calculated according to the formula is A1; when the distance is 1.2 m, a path loss calculated according to the formula is A2. In this case, the preset loss range is A1-A2. The AP mate determines whether the value a of the P-PA is within the range of A1-A2; if yes, it indicates that the terminal is also within the preset distance range.

The foregoing preset distance range or the preset loss range may be variable. For example, a user interactive interface may be set on the AP mate, and the user may properly adjust the preset distance range or the preset path loss range at any time through the interface.

In this step, if a determination result of the AP mate is that the terminal is within the preset distance range, continue to execute 306; otherwise, if a determination result of the AP mate is that the terminal is not within the preset distance range, the process ends, and stop executing 306.

306. The AP mate sends network configuration information to the terminal.

In this embodiment, the AP mate determines, according to the distance between the AP mate and the terminal, whether to send the network configuration information to the terminal. The user only needs to make a terminal, which intends to access a WiFi network, close to the AP mate, the AP mate automatically executes the foregoing processes of calculating and determining the distance between the AP mate and the terminal, and automatically sends network configuration information to the terminal when the terminal is within the preset distance range. For the user, this manner greatly simplifies a user's operation processes because these processes are executed by the AP mate automatically.

307. The terminal sets up a network connection with the AP according to the network configuration information.

For example, the setting up the network connection with the AP may be executing a WPS procedure with the AP, where the WPS procedure refers to, for example, performing authentication and WiFi configuration information transmission with the AP, and automatically configuring information such as an SSID and a network key. In this embodiment, the process in step 307 and the interaction processes between the AP mate and the terminal in the foregoing step 301 to step 306 are collectively referred to as WPS implementation process. In addition, the AP may also execute functions of a register, that is, perform functions such as setting up a network, and adding/deleting a device, to simplify interaction processes between devices and a WPS configuration process.

In addition, which message specifically carries information such as the transmit power or the receive power is not limited in this embodiment so long as the information can be reported and the AP mate can obtain it.

Embodiment 4

Figure 4:
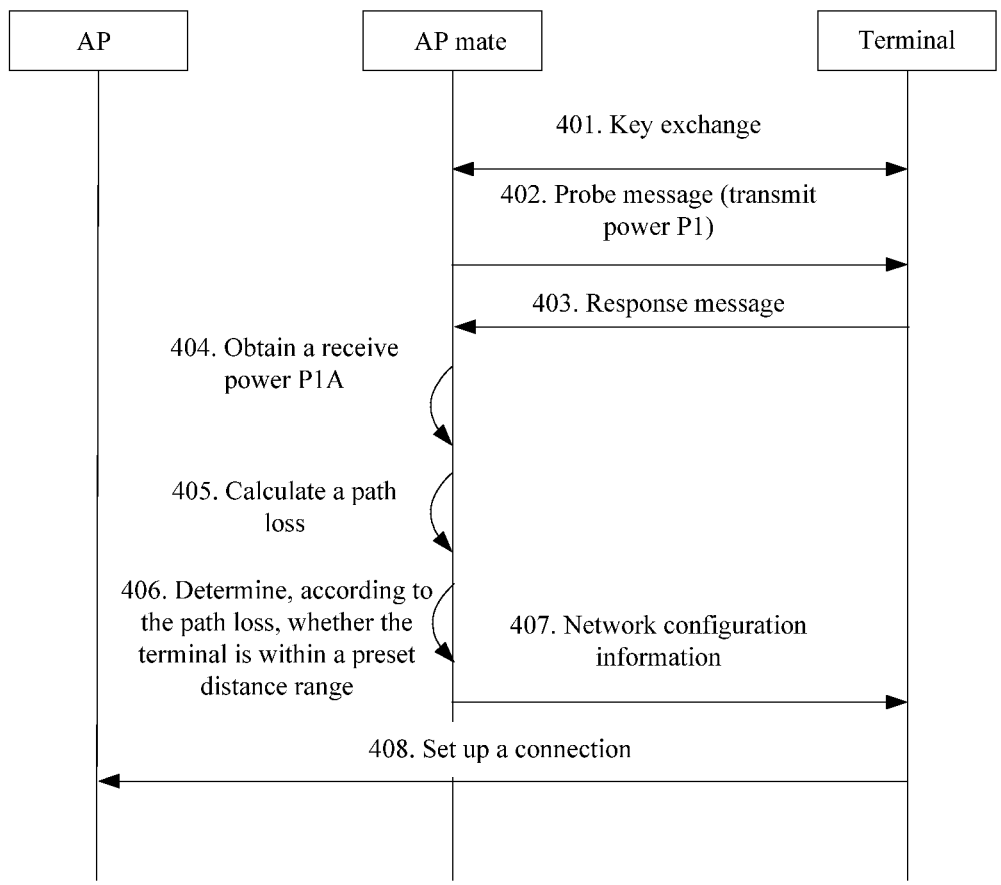
FIG. 4 is a schematic signaling diagram of still another embodiment of a method for setting up a wireless network connection according to the present invention.

FIG. 4 is a schematic signaling diagram of still another embodiment of a method for setting up a wireless network connection according to the present invention. In this embodiment, an AP mate instructs a terminal to return a response message by using a second transmit power, and a power when the AP mate receives the response message is a second receive power. As shown in FIG. 4, the method may include:

401. The AP mate and the terminal obtain a key by using a key exchange algorithm.

402. The AP mate sends a probe message to the terminal, where the probe message is used to instruct the terminal to send a response message by using a transmit power P1.

In this embodiment, the AP mate instructs the terminal to send a probe message by using the transmit power P1, where the transmit power P1 may be referred to as a second transmit power and may be carried by the AP mate in the probe message to inform the terminal.

403. The terminal returns a response message to the AP mate by using the transmit power P1.

The response message returned by the terminal may be referred to as a second response message. The terminal may and may not carry the transmit power P1 in the response message.

404. The AP mate obtains a receive power P1A when the AP mate receives the response message.

When receiving the response message sent by the terminal, the AP mate itself may obtain the receive power P1A when receiving the message, where the receive power P1A may be referred to as a second receive power.

In addition, the AP mate may set that the terminal may not be allowed to access a wireless network if the terminal does not return a response message. In specific implementation, the AP mate may set a timer, and if a response message returned by the terminal is not received after the timer expires, the AP mate may determine that the terminal is not allowed to access the wireless network.

405. The AP mate calculates, according to the obtained transmit power and receive power, a path loss when the probe message is transmitted from the terminal to the AP mate.

The transmit power is the power P1 when the terminal sends the probe message in 403; the receive power is the power P1A when the AP mate receives the probe message in 404. Because power attenuation always occurs in message transmission, the transmit power P1 is greater than the receive power P1A.

The AP mate calculates the path loss as "P1-P1A," which is the path loss produced when the probe message is transmitted from the terminal to the AP mate.

406. The AP mate determines, according to the path loss, whether a distance between the terminal and the AP mate is within a preset distance range.

After obtaining the path loss P1-P1A through the calculation, the AP mate determines the distance between the terminal and the AP mate according to the path loss. As described above, the AP mate may perform determination according to the preset distance range or a preset loss range. The method is the same as that in Embodiment 3, and is not further described.

If a determination result of the AP mate is that the terminal is within the preset distance range, continue to execute 407; otherwise, the process ends.

407. The AP mate sends network configuration information to the terminal.

408. The terminal sets up a network connection with the AP according to the network configuration information.

In the foregoing Embodiment 3 and Embodiment 4 of the present invention, the AP mate implements automatic determination of the distance of the terminal, and automatically sends the network configuration information to the terminal within the preset distance range, which simplifies a user's operation process. On this basis, the following problem may occur in specific implementation.

For example, if a real terminal S1 intends to access a home WiFi network, where the real terminal S1 may be a certain indoor notebook computer, according to the solution in the embodiment of the present invention, under normal circumstances, a user only needs to make the terminal S1 close to an AP mate, and the AP mate executes the foregoing process of determining a distance of the terminal S1. However, there may be a fake terminal S2, and the fake terminal S2 is located outdoors and is not eligible to access the home WiFi network; in addition, the terminal S2 is a little far away from the AP mate because the terminal S2 is located outdoors, and the terminal S2 is generally beyond a preset distance range (e.g., a preset distance of WiFi is small, for example, 1 m). The fake terminal S2 may take a certain measure to enable the AP mate to make wrong determination that a distance between the fake terminal S2 and the AP mate is also within the preset distance range, so that the AP mate also sends network configuration information to the fake terminal S2. In this way, the fake terminal 2 accesses the home WiFi. For example, the fake terminal S2 captures probe information sent by the AP mate to the terminal S1, guesses how many path losses there are to make a distance calculated by the AP mate to be within the preset distance range, and returns an erroneous receive power to the AP mate. For example, an actual receive power of the fake terminal S2 is 5 dB; however, to enable the AP mate to make wrong determination, the fake terminal S2 returns a receive power of 8 dB to the AP mate. In this way, a path loss calculated by the AP mate is smaller than an actual loss, so that the AP mate may determine that the fake terminal S2 is also within the preset distance range, causing that the fake terminal S2 accesses the network successfully.

To avoid the foregoing case of the fake terminal, the following Embodiment 5 to Embodiment 7 describe several feasible solutions for identifying a real terminal and a fake terminal to better ensure security of setting up a WiFi network connection.

Embodiment 5

Figure 5:
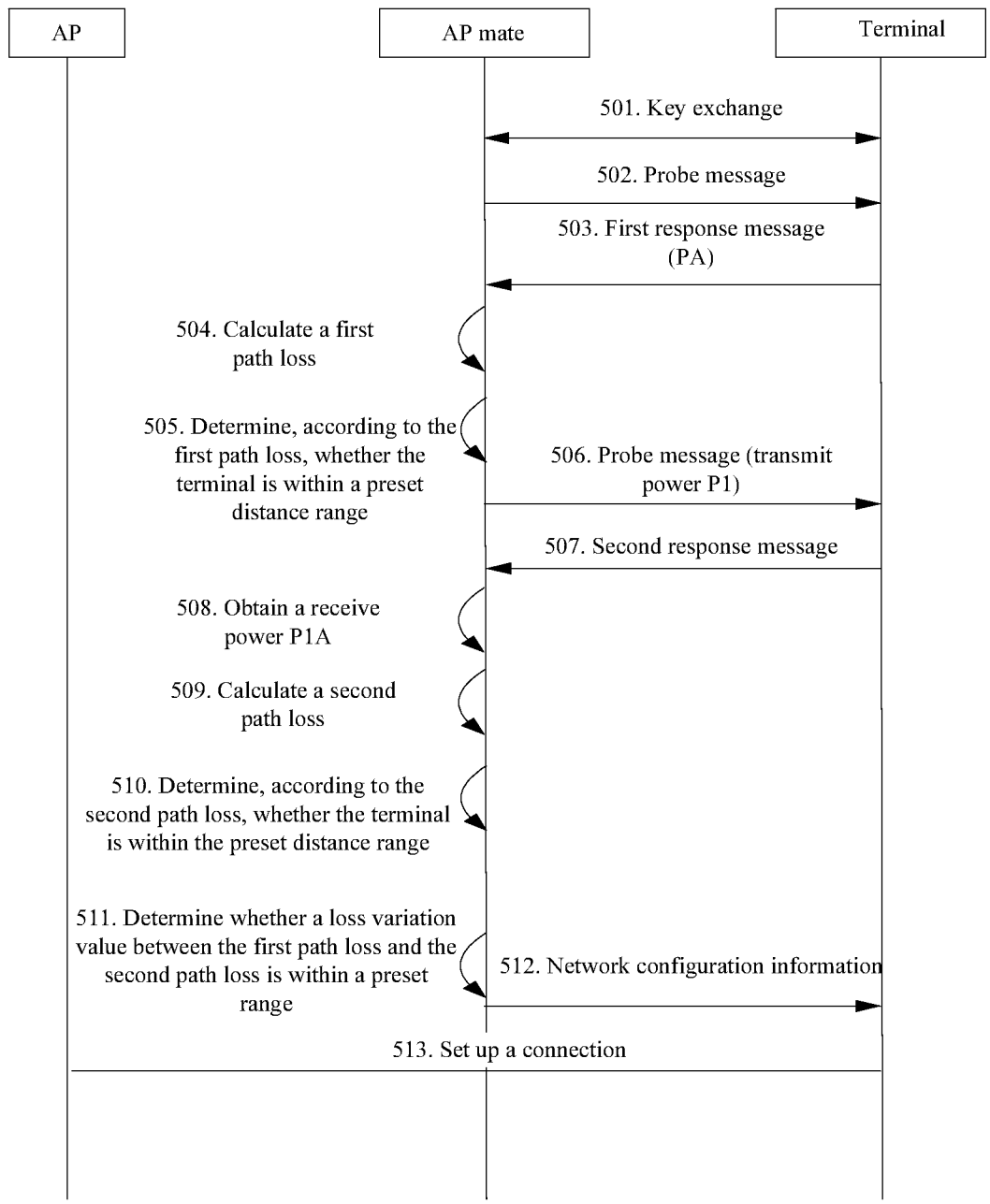
FIG. 5 is a schematic signaling diagram of still another embodiment of a method for setting up a wireless network connection according to the present invention.

FIG. 5 is a schematic signaling diagram of still another embodiment of a method for setting up a wireless network connection according to the present invention. In this embodiment, a message is transmitted twice, that is, the message is transmitted from an AP mate to a terminal, and the message is transmitted from the terminal to the AP mate; a difference between path losses of the two transmissions is compared; a determination basis is that a difference between path losses caused in two transmissions is usually large because a fake terminal adopts a manner of guessing a loss; the AP mate has high sensitivity, and obtains the difference between the two losses; a difference between two path losses caused by a real device is generally small and the two path losses are basically the same.

This embodiment is a process that integrates identifying authenticity of a terminal with determining a distance of the terminal. Therefore, this embodiment is equivalent to a combination of Embodiment 3 and Embodiment 4. However, a sequence of the foregoing two transmissions is not limited. In this embodiment, that transmission from the AP mate to the terminal is executed first and then transmission from the terminal to the AP mate is executed is taken as an example for description. As shown in FIG. 5, the method may include:

501. The AP mate and the terminal obtain a key by using a key exchange algorithm.

502. The AP mate sends a probe message to the terminal by using a first transmit power P.

503. The terminal returns a first response message to the AP mate, where the first response message carries a first receive power PA when the terminal receives the probe message.

504. The AP mate calculates, according to the first transmit power P and the first receive power PA for transmission of the probe message, a first path loss when the probe message is transmitted from the AP mate to the terminal.

The first path loss is P-PA.

505. The AP mate determines, according to the first path loss, whether a distance between the terminal and the AP mate is within a preset distance range.

If a determination result of the AP mate is that the terminal is within the preset distance range, then, to ensure that the terminal is a real terminal, continue to execute 506; otherwise, if a determination result of the AP mate is that the terminal is not within the preset distance range, the process ends.

506. The AP mate sends a probe message to the terminal, where the probe message is used to instruct the terminal to send a second response message by using a second transmit power P1.

507. The terminal sends the second response message to the AP mate by using the second transmit power P1.

508. The AP mate obtains a second receive power P1A when the AP mate receives the second response message.

509. The AP mate calculates, according to the obtained second transmit power and second receive power P1A, a path loss when the probe message is transmitted from the terminal to the AP mate.

A second path loss is P1-P1A.

510. The AP mate determines, according to the second path loss, whether a distance between the terminal and the AP mate is within the preset distance range.

If a determination result of the AP mate is that the terminal is within the preset distance range, continue to execute 511; otherwise, the process ends.

511. Compare the second path loss with the first path loss, and determine whether a loss variation value between the two is within a preset loss variation value range.

If the terminal is a real terminal, namely, a real device, a difference between path losses in the two transmissions is not large, and even if there is a slight difference, the slight difference is a minor difference within a reasonable range. However, if the terminal is a fake terminal, because the fake terminal guesses a path loss, and what the fake terminal reports to the AP mate is not a real receive power, a difference between path losses in the two transmissions is large. It is very difficult for the fake terminal to guess the path loss correctly, and the AP mate has high sensitivity. Therefore, the AP mate can generally discover the large difference between the path losses in the two transmissions performed by the fake terminal.

The loss variation value may be a difference, or a ratio, or another mathematical value, which can indicate variation, between the first path loss and the second path loss. In this embodiment, the AP mate may set a preset loss variation value range, where the preset loss variation value range is set by taking a fact that a reasonable tiny difference may also exist between the two transmissions performed by the real terminal into consideration. The AP mate may determine whether the difference between the second path loss and the first path loss is within the preset loss range; if yes, it indicates that the terminal is a real device, and 512 continues to be executed; otherwise, it indicates that the terminal is a fake terminal, and the process ends. Then, the AP mate does not send network configuration information to the terminal, thereby avoiding access of the fake terminal and improving security of network setup.

512. The AP mate sends network configuration information to the terminal.

513. The terminal sets up a network connection with the AP according to the network configuration information.

Embodiment 6

Figure 6:
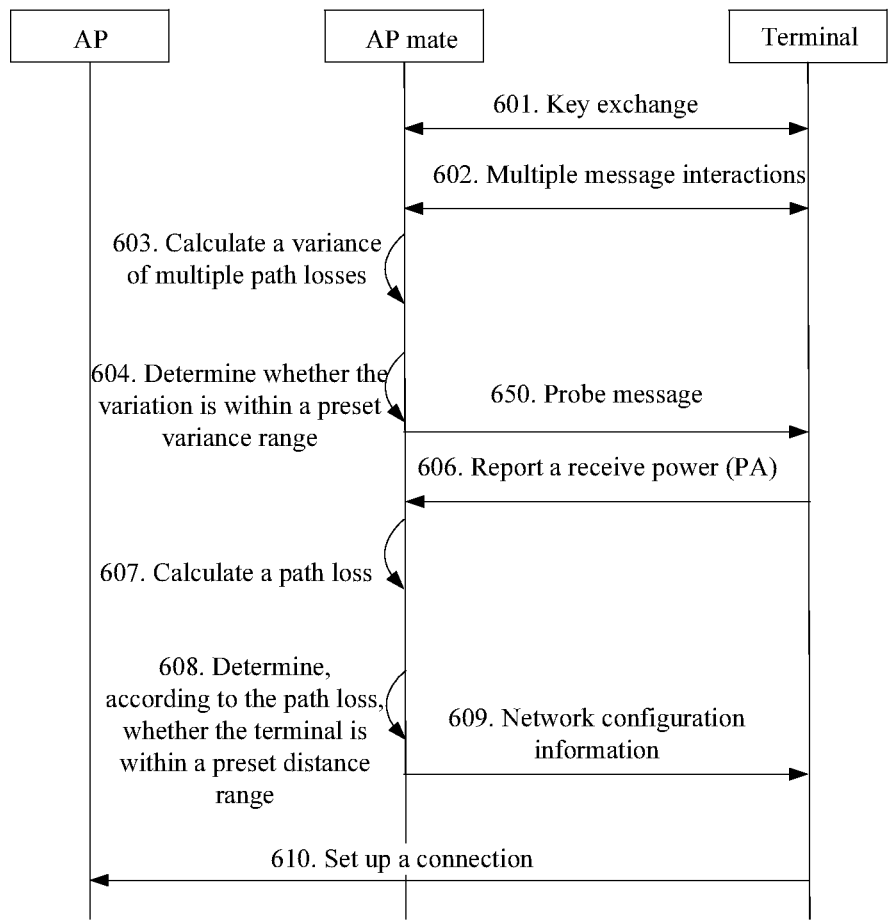
FIG. 6 is a schematic signaling diagram of still another embodiment of a method for setting up a wireless network connection according to the present invention.

FIG. 6 is a schematic signaling diagram of still another embodiment of a method for setting up a wireless network connection according to the present invention. In this embodiment, authenticity of a terminal is identified according to the fluctuation of path losses, specifically, according to the variance of multiple path losses. Assuming that a fake terminal is set outdoors, where an outdoor environment is complex, and when the fake terminal communicates with an indoor AP mate, a signal needs to go through obstacles such as walls. Therefore, the fluctuation of path losses in multiple times of message interaction is large. Even if the fake terminal is not set outdoors, no matter where the fake terminal is located, because the fake terminal does not report a power to the AP mate truthfully (if the fake terminal reports a power truthfully, the AP mate easily identifies a real distance of the fake terminal), the fluctuation of path losses in multiple times of message interaction is still large. Generally, the fake terminal does not guess a path loss very accurately.

This embodiment is also a process that integrates identifying the authenticity of a terminal with determining a distance of the terminal. Therefore, determining a path loss variance is combined with determining the distance of the terminal. However, a sequence of executing these two aspects is not limited. For example, the authenticity of the terminal may be determined first by using the path loss variance, and if the terminal is a real terminal, the distance of the terminal is determined; or, as described in Embodiment 5, the distance of the terminal is determined first, and if the distance meets a condition, the authenticity of the terminal is determined; or, the authenticity of the terminal and the distance of the terminal are determined together. This embodiment takes the former as an example, that is, determining the authenticity of the terminal is executed first. As shown in FIG. 6, the method may include:

601. The AP mate and the terminal obtain a key by using a key exchange algorithm.

602. The AP mate and the terminal perform multiple times of message interaction.

The multiple times of message interaction refer to executing multiple unidirectional message transmissions between the AP mate and the terminal. For example, for the first time, the AP mate sends a probe message to the terminal by using a certain transmit power; for the second time, the AP mate instructs the terminal to send a response message by using a certain transmit power; for the third time, the AP mate sends the probe message to the terminal by using a certain transmit power.

603. The AP mate calculates a floating variation value of path losses in multiple times of message interaction, for example, a variance.

The AP mate obtains a transmit power and a receive power in each unidirectional message transmission. For an obtaining manner, reference may be made to the foregoing embodiments; then, the AP mate calculates a path loss in each unidirectional transmission according to the transmit power and the receive power, and may obtain multiple path loss values in total; finally, the AP mate calculates the floating variation value of the multiple path losses.

The floating variation value may be a variance, or a standard deviation, or another mathematical value, which can indicate the variation, of the multiple path losses.

604. The AP mate determines whether the obtained floating variation value is within a preset floating variation value range, for example, a preset variance range.

Considering that generally a reasonable fluctuation is unavoidable in multiple message transmissions, a preset floating variation value range may be set in the AP mate. So long as the variance obtained in 603 is within the preset floating variation value range, it indicates that the terminal is a real device, and 605 continues to be executed; otherwise, it indicates that a fluctuation in the multiple message transmissions is large and exceeds a reasonable range, the terminal is a fake terminal, and the process ends.

605. The AP mate sends a probe message to the terminal by using a transmit power P.

606. The terminal reports, to the AP mate, a receive power PA when receiving the probe message.

607. The AP mate calculates, according to the transmit power P and the receive power PA for transmission of the probe message, a path loss when the probe message is transmitted from the AP mate to the terminal.

The path loss is P-PA.

608. The AP mate determines, according to the path loss, whether a distance between the terminal and the AP mate is within a preset distance range.

If a determination result of the AP mate is that the terminal is within the preset distance range, continue to execute 609; otherwise, the process ends.

609. The AP mate sends network configuration information to the terminal.

610. The terminal sets up a network connection with the AP according to the network configuration information.

Embodiment 7

Figure 7:
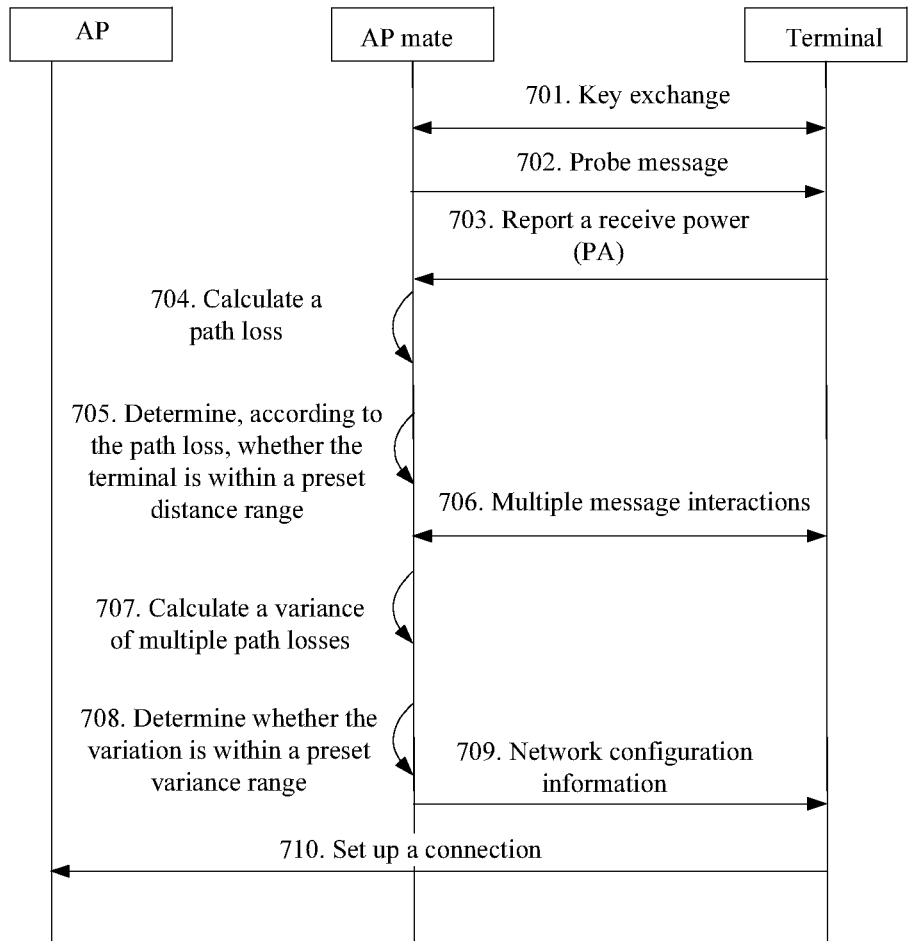
FIG. 7 is a schematic signaling diagram of still another embodiment of a method for setting up a wireless network connection according to the present invention.

FIG. 7 is a schematic signaling diagram of still another embodiment of a method for setting up a wireless network connection according to the present invention. In this embodiment, an example that a distance of a terminal is determined first and then authenticity of the terminal is determined according to a path loss variance is taken. As shown in FIG. 7, the method includes:

701. An AP mate and a terminal obtain a key by using a key exchange algorithm.

702. The AP mate sends a probe message to the terminal by using a transmit power P.

703. The terminal reports, to the AP mate, a receive power PA when receiving the probe message.

704. The AP mate calculates, according to the transmit power P and the receive power PA for transmission of the probe message, a path loss P-PA when the probe message is transmitted from the AP mate to the terminal.

705. The AP mate determines, according to the path loss, whether a distance between the terminal and the AP mate is within a preset distance range.

If a determination result of the AP mate is that the terminal is within the preset distance range, continue to execute 706 to determine authenticity of the terminal; otherwise, the process ends.

706. The AP mate and the terminal perform multiple times of message interaction.

707. The AP mate calculates a variance of path losses in the multiple times of probe message interaction.

708. The AP mate determines whether the obtained variance is within a preset variance range.

If the variance obtained in 707 is within the preset variance range, it indicates that the terminal is a real device, and 709 continues to be executed; otherwise, it indicates that the fluctuation in multiple message transmissions is large and exceeds a reasonable range, the terminal is a fake terminal, and the process ends.

709. The AP mate sends network configuration information to the terminal.

710. The terminal sets up a network connection with the AP mate according to the network configuration information.

Figure 8:
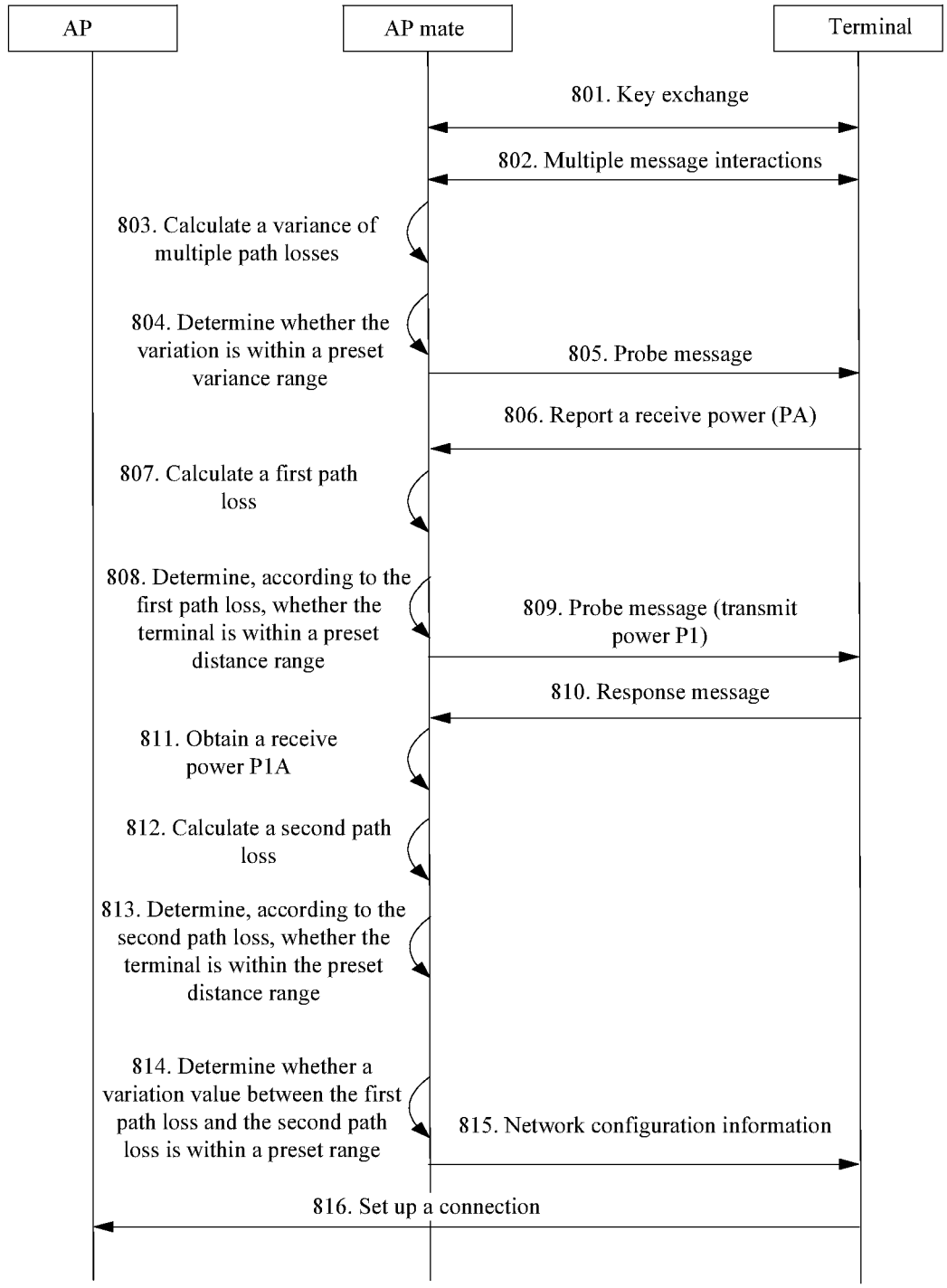
FIG. 8 is a schematic signaling diagram of still another embodiment of a method for setting up a wireless network connection according to the present invention.

The foregoing several examples list several feasible solutions; however, in specific implementation, the present invention is not limited thereto, and changes may be made to multiple solutions. For example, determining the path loss variance may also be combined with the manner in which the AP mate instructs the terminal to send a response message by using a certain transmit power, and an execution sequence is not limited; or, determining the path loss variance and identifying the authenticity of the terminal through two message transmissions are both adopted, to further ensure accuracy of identifying a fake terminal. For example, FIG. 8 is a schematic signaling diagram of still another embodiment of a method for setting up a wireless network connection according to the present invention. FIG. 8 shows an optional manner that includes determining authenticity of a terminal according to a path loss variance, determining the authenticity of the terminal according to a variation value of two path losses, and determining a distance according to a path loss are combined. All steps in FIG. 8 are described in the foregoing embodiments, and these steps are combined together here. The specific solution of each step is the same as that in the foregoing embodiments, and details are not further described.

Embodiment 8

An embodiment of the present invention provides a wireless access device, where the wireless access device is the AP mate in the foregoing method embodiments.

Figure 9:
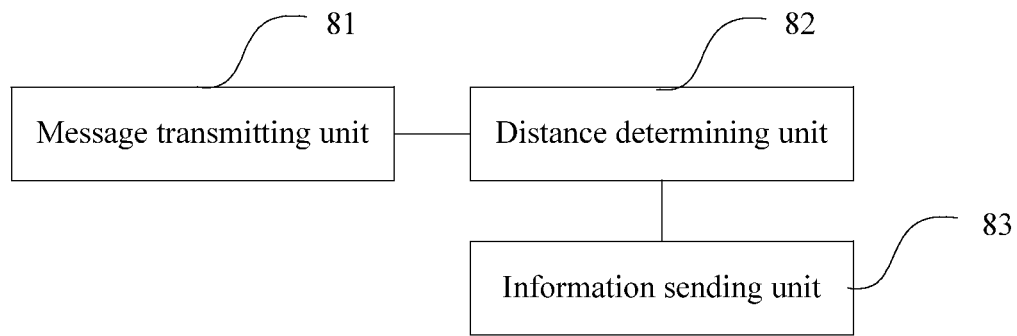
FIG. 9 is a schematic structural diagram of an embodiment of a first device according to the present invention.

FIG. 9 is a schematic structural diagram of an embodiment of a first device according to the present invention. As shown in FIG. 9, the wireless access device may include a message transmitting unit 81, a distance determining unit 82, and an information sending unit 83.

The message transmitting unit 81 is configured to: send a probe message to a second device by using a first transmit power, and receive a first response message returned by the second device, where the first response message carries a first receive power when the second device receives the probe message; or, send a probe message to the second device, where the probe message is used to instruct the second device to send a second response message by using a second transmit power, receive the second response message, and obtain, through detection, a second receive power when receiving the second response message; or, send a probe message to a second device by using a first transmit power, where the probe message is used to instruct the second device to send a third response message by using a second transmit power, receive the third response message, where the third response message carries a first receive power when the second device receives the probe message, and obtain, through detection, a second receive power when receiving the third response message.

The distance determining unit 82 is configured to: obtain, according to the first transmit power and the first receive power or according to the second transmit power and the second receive power, a path loss between the first device and the second device; and determine, according to the path loss, that a distance between the first device and the second device is within a preset distance range.

The information sending unit 83 is configured to, when the distance determining unit determines that the distance between the first device and the second device is within the preset distance range, send network configuration information to the second device, so that the second device sets up, according to the network configuration information, a connection with the wireless network.

Figure 10:
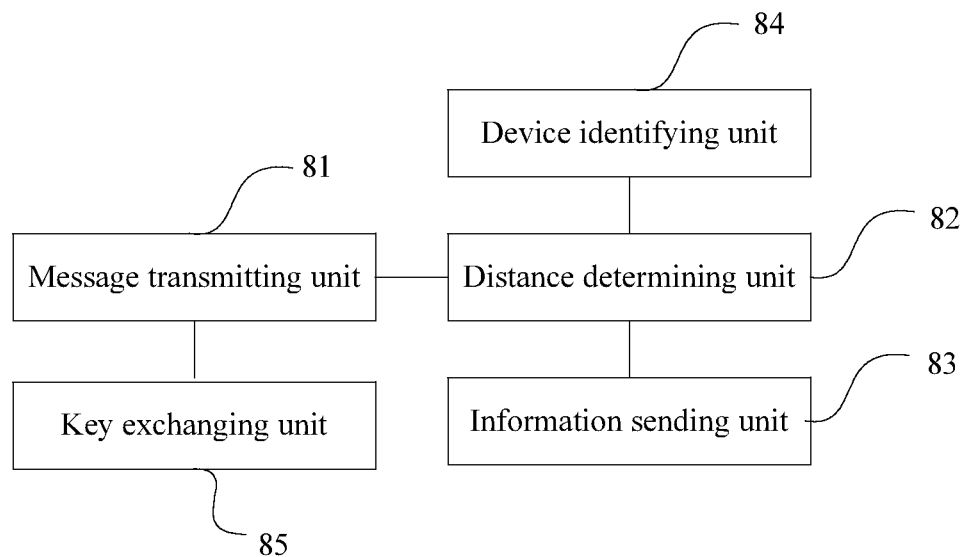
FIG. 10 is a schematic structural diagram of another embodiment of a first device according to the present invention.

FIG. 10 is a schematic structural diagram of another embodiment of a first device according to the present invention. On the basis of the structure shown in FIG. 9, the wireless access device may further include a device identifying unit 84.

The path loss obtained by the distance determining unit 82 according to the first transmit power and the first receive power is a first path loss, and the path loss obtained according to the second transmit power and the second receive power is a second path loss.

The device identifying unit 84 is configured to: compare the second path loss with the first path loss; if a loss variation value between the two is within a preset loss variation value range, identify a terminal as a real device, and instruct the information sending unit to send network configuration information to the second device.

Further, there are multiple path losses obtained by the distance determining unit 82.

The device identifying unit 84 is further configured to: calculate a floating variation value of the multiple path losses, and if the floating variation value is within a preset floating variation value range, identify a terminal as a real device, and instruct the information sending unit to send network configuration information to the second device.

Further, the first device may further include a key exchanging unit 85 configured to, before the probe message is sent to the second device, obtain a key by using a key exchange algorithm with the second device to encrypt, by using the key, the probe message sent to the second device and decrypt, by using the key, a response message received from the second device, where the response message is the first response message, the second response message or the third response message.

Embodiment 9

Figure 11:
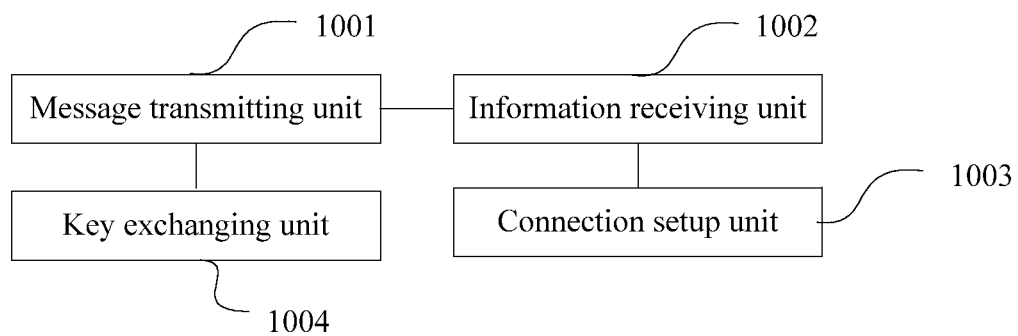
FIG. 11 is a schematic structural diagram of an embodiment of a second device according to the present invention.

FIG. 11 is a schematic structural diagram of an embodiment of a second device according to the present invention. The second device may execute the method in any embodiment of the present invention. As shown in FIG. 11, the second device in this embodiment may include a message transmitting unit 1001, an information receiving unit 1002, and a connection setup unit 1003.

The message transmitting unit 1001 is configured to: receive a probe message that is sent by the first device by using a first transmit power, and return a first response message to the first device, where the first response message carries a first receive power when the second device receives the probe message; or, receive a probe message sent by the first device, where the probe message is used to instruct the second device to send a second response message by using a second transmit power, and send the second response message to the first device, so that the first device obtains, through detection, a second receive power when receiving the second response message; or, receive a probe message that is sent by the first device by using a first transmit power, where the probe message is used to instruct the second device to send a third response message by using a second transmit power, send the third response message to the first device, where the third response message carries a first receive power when the second device receives the probe message, so that the first device obtains, through detection, a second receive power when receiving the third response message.

The information receiving unit 1002 is configured to receive network configuration information which is needed for accessing a wireless network and sent by the first device, where the network configuration information is sent by the first device when the first device determines, according to the first transmit power and the first receive power or according to the second transmit power and the second receive power, that a distance between the first device and the second device is within a preset distance range.

The connection setup unit 1003 is configured to set up a connection with the wireless network according to the network configuration information.

Further, the second device further includes a key exchanging unit 1004 configured to, before the probe message sent by the first device is received, obtain a key by using a key exchange algorithm with the first device to encrypt, by using the key, a response message sent to the first device and decrypt, by using the key, the probe message received from the first device, where the response message is the first response message, the second response message or the third response message.

Embodiment 10

Figure 12:
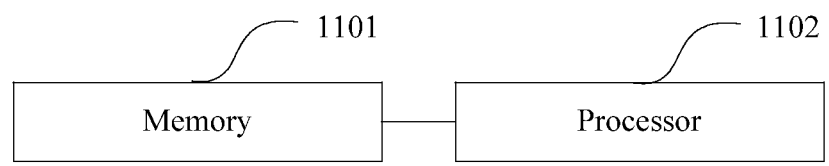
FIG. 12 is a schematic structural diagram of still another embodiment of a first device according to the present invention.

FIG. 12 is a schematic structural diagram of still another embodiment of a first device according to the present invention. As shown in FIG. 12, the first device in this embodiment may include a memory 1101 and a processor 1102.

The memory 1101 is configured to store a preset distance range between a second device and a wireless device and network configuration information.

The processor 1102 is configured to send a probe message to the second device by using a first transmit power, and receive a first response message returned by the second device, where the first response message carries a first receive power when the second device receives the probe message; or, send a probe message to the second device, where the probe message is used to instruct the second device to send a second response message by using a second transmit power, receive the second response message, and obtain, through detection, a second receive power when receiving the second response message; or, send a probe message to the second device by using a first transmit power, where the probe message is used to instruct the second device to send a third response message by using a second transmit power, receive the third response message, where the third response message carries a first receive power when the second device receives the probe message, and obtain, through detection, a second receive power when receiving the third response message; and, obtain, according to the first transmit power and the first receive power or according to the second transmit power and the second receive power, a path loss between the first device and the second device; determine, according to the path loss, that a distance between the first device and the second device is within the preset distance range; and when the distance determining unit determines that the distance between the first device and the second device is within the preset distance range, send the network configuration information to the second device.

Further, the memory 1101 is further configured to store a preset loss variation value range. The processor 1102 is specifically configured to: compare a second path loss with a first path loss, and if a loss variation value between the two is within the preset loss variation value range, identify a terminal as a real device, and send the network configuration information to the second device.

Further, the memory 1101 is configured to store a preset floating variation value range. The processor 1102 is further configured to: calculate a floating variation value of multiple path losses, and if the floating variation value is within the preset floating variation value range, identify a terminal as a real device.

Further, the processor 1102 is configured to, before the probe message is sent to the second device, obtain a key by using a key exchange algorithm with the second device to encrypt, by using the key, the probe message sent to the second device and decrypt, by using the key, a response message received from the second device, where the response message is the first response message, the second response message or the third response message.

Figure 13:
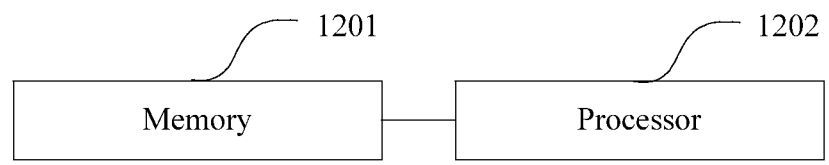
FIG. 13 is a schematic structural diagram of another embodiment of a second device according to the present invention.

FIG. 13 is a schematic structural diagram of another embodiment of a second device according to the present invention. As shown in FIG. 13, the second device in this embodiment may include a memory 1201 and a processor 1202.

The memory 1201 is configured to store network configuration information received from a first device.

The processor 1202 is configured to: receive a probe message that is sent by the first device by using a first transmit power, and return a first response message to the first device, where the first response message carries a first receive power when the second device receives the probe message; or, receive a probe message sent by the first device, where the probe message is used to instruct the second device to send a second response message by using a second transmit power, and send the second response message to the first device, so that the first device obtains, through detection, a second receive power when receiving the second response message; or, receive a probe message that is sent by the first device by using a first transmit power, where the probe message is used to instruct the second device to send a third response message by using a second transmit power, and send the third response message to the first device, where the third response message carries a first receive power when the second device receives the probe message, so that the first device obtains, through detection, a second receive power when receiving the third response message; and, receive the network configuration information which is needed for accessing a wireless network and sent by the first device, where the network configuration information is sent by the first device when the first device determines, according to the first transmit power and the first receive power or according to the second transmit power and the second receive power, that a distance between the first device and the second device is within a preset distance range; and set up a connection with the wireless network according to the network configuration information.

Further, the processor 1202 is further configured to, before the probe message sent by the first device is received, obtain a key by using a key exchange algorithm with the first device to encrypt, by using the key, a response message sent to the first device and decrypt, by using the key, the probe message received from the first device, where the response message is the first response message, the second response message or the third response message.

Persons of ordinary skill in the art should understand that all or part of the steps of the foregoing method embodiments may be implemented by a program instructing relevant hardware. The program may be stored in a computer readable storage medium. When the program is run, the steps of the foregoing method embodiments are performed. The storage medium includes any medium capable of storing program codes, such as read-only memory (ROM), random-access memory (RAM), magnetic disk, or optical disk.

Finally, it should be noted that the foregoing embodiments are merely used for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments, or make equivalent substitutions to part or all of the technical features; however, these modifications or substitutions do not make the essence of corresponding technical solutions depart from the scope of the technical solutions of the embodiments of the present invention.

What is claimed is:

1. A method for setting up a wireless network connection comprising:
   sending, by a first device, a third probe message to a second device by using a first transmit power, wherein the third probe message is used to instruct the second device to send a third response message by using a second transmit power;
   receiving, by the first device, the third response message, wherein the third response message carries a first receive power when the second device receives the third probe message;
   obtaining, by the first device through detection, a second receive power when receiving the third response message;
   obtaining, by the first device, a first path loss according to the first transmit power and the first receiver power;
   obtaining, by the first device, a second path loss according to the second transmit power and the second receive power; and
   sending, by the first device, network configuration information needed for accessing a wireless network to the second device such that the second device sets up a connection with the wireless network according to the network configuration information when determining that a distance between the first device and the second device is within a preset distance range according to the first path loss or the second path loss, and when identifying the second device as a real device when a loss variation value between the first path loss and the second path loss is within a preset loss variation value range by comparing the second path loss with the first path loss.

2. The method for setting up the wireless network connection according to claim 1, wherein multiple of the first path losses or the second path losses are obtained by the first device, wherein after determining, by the first device according to the first path loss or the second path loss, that the distance between the first device and the second device is within the preset distance range and before sending, by the first device, the network configuration information needed for accessing the wireless network to the second device, the method further comprises calculating, by the first device, a floating variation value of the multiple of the first path losses or the second path losses, and identifying the second device terminal as a real device when the floating variation value is within a preset floating variation value range.

3. The method for setting up the wireless network connection according to claim 1, wherein before sending, by the first device, the third probe message to the second device, the method further comprises obtaining, by the first device, a key by using a key exchange algorithm with the second device to encrypt, by using the key, the third probe message sent to the second device and decrypt, by using the key, the third response message received from the second device.

4. A method for setting up a wireless network connection comprising:
receiving, by a second device, a third probe message that is sent by a first device by using a first transmit power, wherein the third probe message is used to instruct the second device to send a third response message by using a second transmit power;
sending, by the second device, the third response message to the first device, wherein the third response message carries a first receive power when the second device receives the third probe message such that the first device obtains, through detection, a second receive power when receiving the third response message;
receiving, by the second device, network configuration information which is needed for accessing a wireless network and sent by the first device, wherein the network configuration information is sent by the first device when the first device determines, according to the first transmit power and the first receive power or according to the second transmit power and the second receive power, that a distance between the first device and the second device is within a preset distance range and when the first device identifies the second device as a real device when a loss variation value between a first path loss and a second path loss is within a preset loss variation value range by comparing the second path loss with the first path loss, wherein the first path loss is obtained by the first device according to the first transmit power and the first receiver power, and the second path loss is obtained by the first device according to the second transmit power and the second receive power; and
setting up, by the second device, a connection with the wireless network according to the network configuration information.

5. The method for setting up the wireless network connection according to claim 4, wherein before receiving, by the second device, the third probe message sent by the first device, the method further comprises obtaining, by the second device, a key by using a key exchange algorithm with the first device to encrypt, by using the key, the third response message sent to the first device and decrypt, by using the key, the third probe message received from the first device.

6. A first device comprising:
a hardware processor configured to:
send a third probe message to a second device by using a first transmit power, wherein the third probe message is used to instruct the second device to send a third response message by using a second transmit power;
receive the third response message, wherein the third response message carries a first receive power when the second device receives the third probe message;
obtain, through detection, a second receive power when receiving the third response message;
obtain, according to the first transmit power and the first receive power or according to the second transmit power and the second receive power, a path loss between the first device and the second device;
determine, according to the path loss, that a distance between the first device and the second device is within a preset distance range, wherein the path loss obtained according to the first transmit power and the first receive power is a first path loss, wherein the path loss obtained according to the second transmit power and the second receive power is a second path loss;
compare the second path loss with the first path loss to identify the second device as a real device when a loss variation between the first path loss and the second path loss is within a preset loss variation value range; and
send network configuration information to the second device such that the second device sets up, according to the network configuration information, a connection with the wireless network when the distance between the first device and the second device is within the preset distance range and when the second device is identified as a real device.

7. The first device according to claim 6, wherein multiple of the first path losses or the second path losses are obtained, and wherein the hardware processor is further configured to calculate a floating variation value of the multiple of the first path losses or the second path losses, and identify the terminal as a real device and instruct the information sending unit to send the network configuration information to the second device when the floating variation value is within a preset floating variation value range.

8. The first device according to claim 6, wherein the hardware processor is further configured to, before the third probe message is sent to the second device, obtain a key by using a key exchange algorithm with the second device to encrypt, by using the key, the third probe message sent to the second device and decrypt, by using the key, the third response message received from the second device.

9. A second device comprising:
a hardware processor configured to:
receive a third probe message that is sent by a first device by using a first transmit power, wherein the third probe message is used to instruct the second device to send a third response message by using a second transmit power;
send the third response message to the first device, wherein the third response message carries a first receive power when the second device receives the third probe message such that the first device obtains, through detection, a second receive power when receiving the third response message;
receive network configuration information that is needed for accessing a wireless network and sent by the first device, wherein the network configuration information is sent by the first device when the first device determines, according to the first transmit power and the first receive power or according to the second transmit power and the second receive power, that a distance between the first device and the second device is within a preset distance range and when the first device identifies the second device as a real device when a loss variation value between a first path loss and a second path loss is within a preset loss variation value range by comparing the second path loss with the first path loss, wherein the first path loss is obtained by the first device according to the first transmit power and the first receiver power, and the second path loss is obtained by the first device according to the second transmit power and the second receive power; and
set up a connection with the wireless network according to the network configuration information.

10. The second device according to claim 9, wherein the hardware processor is further configured to, before the third probe message sent by the first device is received, obtain a key by using a key exchange algorithm with the first device to encrypt, by using the key, the first, the second, or the third response message sent to the first device and decrypt, by using the key, the first, the second, or the third probe message received from the first device.

* * * * *

UNITED STATES PATENT AND TRADEMARK OFFICE
CERTIFICATE OF CORRECTION

PATENT NO.         : 8,929,549 B2                                    Page 1 of 1
APPLICATION NO.    : 13/731306
DATED              : January 6, 2015
INVENTOR(S)        : Gaokun Pang, Guiming Shu and Zhiming Ding It is certified that error appears in the above-identified patent and that said Letters Patent is hereby corrected as shown below:

In the Claims

Column 24, Lines 65-67 and Column 25, Lines 1-5, Claim 10 should read:

The second device according to claim 9, wherein the hardware processor is further configured to, before the third probe message sent by the first device is received, obtain a key by using a key exchange algorithm with the first device to encrypt, by using the key, the third response message sent to the first device and decrypt, by using the key, the third probe message received from the first device.

Signed and Sealed this
Twenty-first Day of April, 2015

Michelle K. Lee
*Director of the United States Patent and Trademark Office*